United States Patent [19]

Eisenhardt et al.

[11] 3,825,358
[45] July 23, 1974

[54] TOOL BAR CLAMP
[75] Inventors: Fred W. Eisenhardt; Hartley N. Ellingson, both of Fargo, N. Dak.
[73] Assignee: Alloway Manufacturing, Inc., Fargo, N. Dak.
[22] Filed: Aug. 30, 1971
[21] Appl. No.: 176,169

Related U.S. Application Data
[63] Continuation-in-part of Ser. No. 48,258, June 22, 1970, Pat. No. 3,642,333.

[52] U.S. Cl. .................................. 403/188, 403/385
[51] Int. Cl. ............................................. F16b 7/00
[58] Field of Search .......... 306/1.5; 287/54 A, 54 B; 172/763; 403/188, 385, 386, 400

[56] References Cited
UNITED STATES PATENTS
| 856,200 | 6/1907 | Allin | 306/1.5 |
| 1,097,299 | 5/1914 | Carlson | 306/1.5 |
| 3,252,522 | 5/1966 | Taylor | 172/763 X |
| 3,325,228 | 6/1967 | Lien | 287/54 A X |
| 3,550,969 | 12/1970 | Robinson | 306/1.5 |

*Primary Examiner*—Andrew V. Kundrat

[57] ABSTRACT

A tool bar clamp for connecting a standard of an earth working tool holder to a support, as a tool bar of a cultivator. The clamp has a body with a passageway for receiving a portion of the standard. A first pair of nut and bolt assemblies, engageable with the forward edge of the standard, clamp the standard against the back of the body. A second pair of nut and bolt assemblies, mounted on the side of the body, clamp the side of the standard in the body to fix the lateral and perpendicular position of the standard in the clamp. The body is mounted on the support with a retainer and a pair of nut and bolt assemblies. The retainer and body have projections or legs that can accommodate tool bars having square, diamond and T shapes.

23 Claims, 9 Drawing Figures

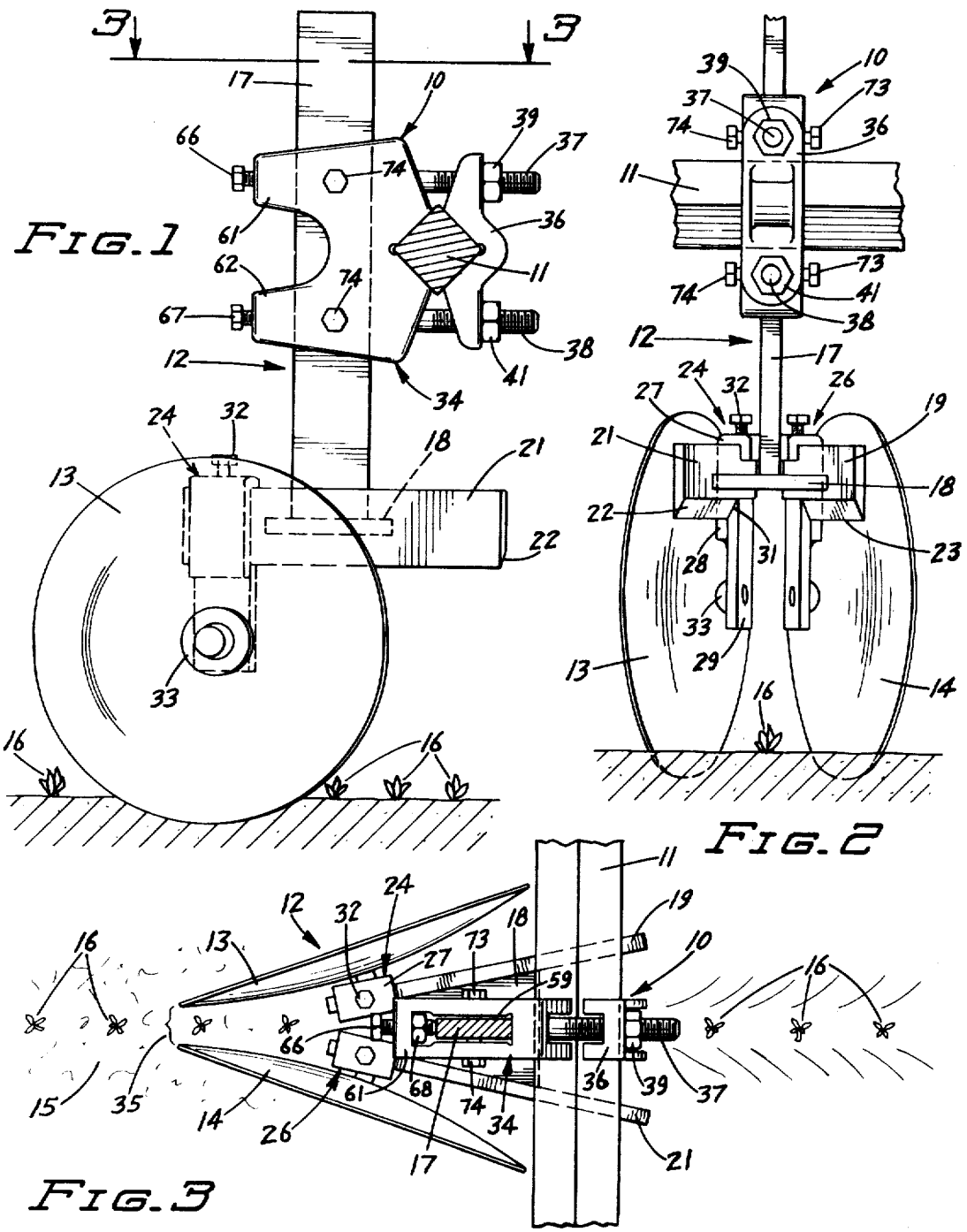

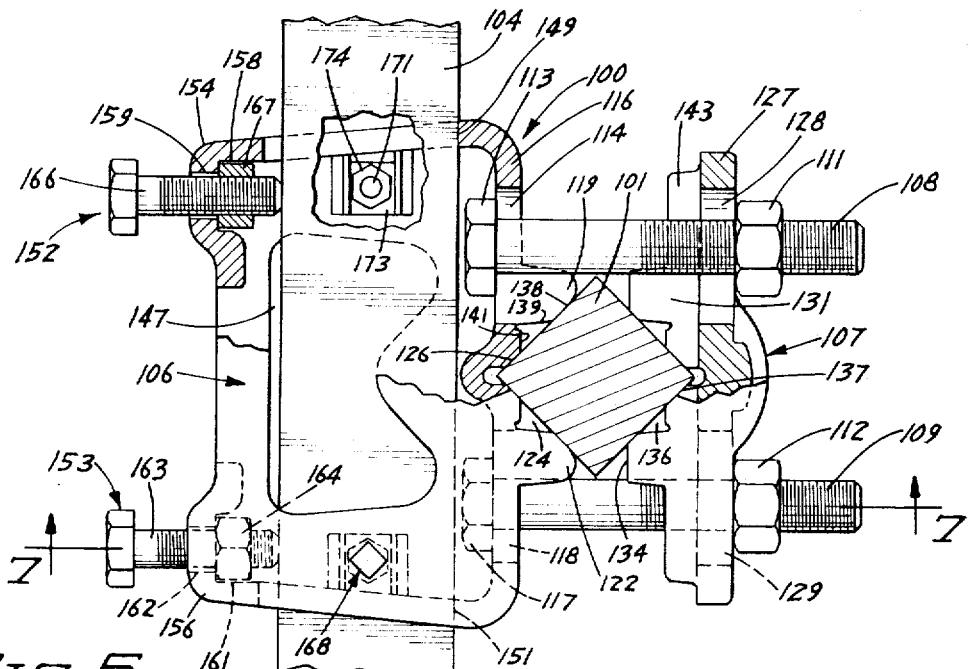
FIG.6
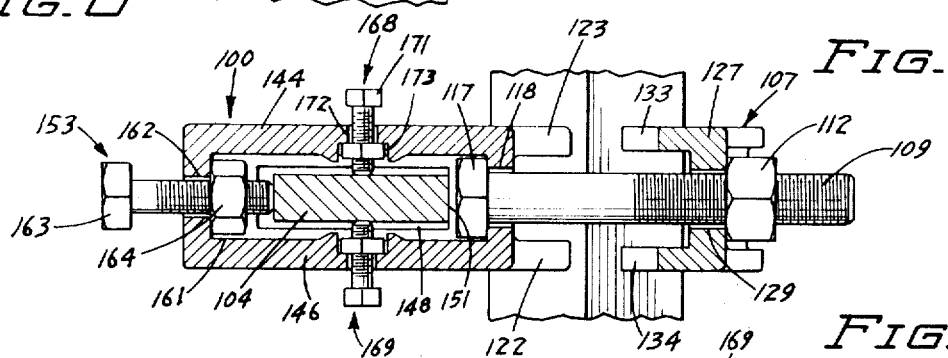
FIG.7
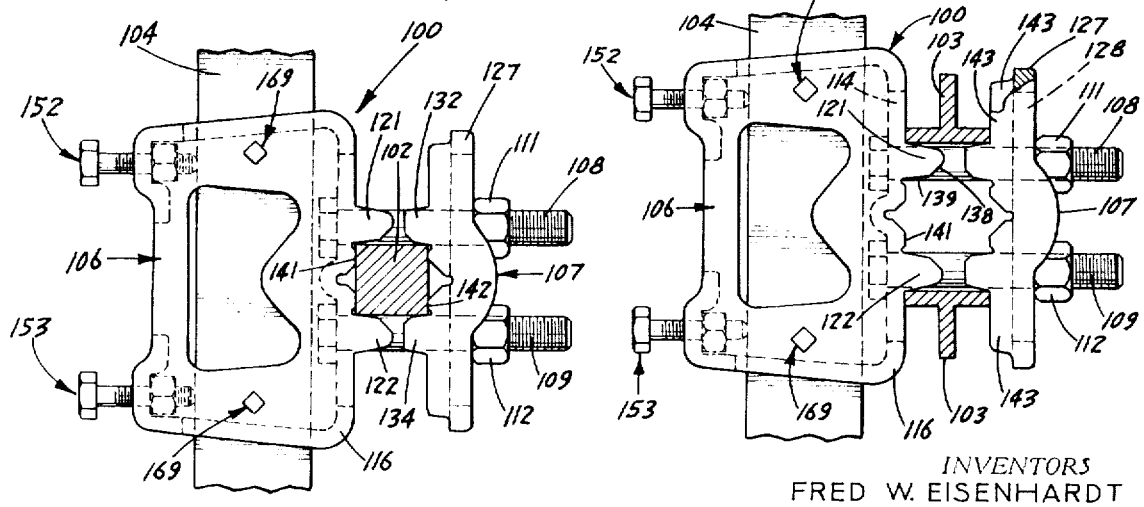
FIG.8
FIG.9
INVENTORS
FRED W. EISENHARDT
HARTLEY N. ELLINGSON
BY
Burd, Braddock & Bartz
ATTORNEYS

TOOL BAR CLAMP

REFERENCE TO RELATED APPLICATION

This application is a continuation-in-part of U.S. Patent application Ser. No. 48,258, now U.S. Pat. No. 3,642,333.

BACKGROUND OF THE INVENTION

Row crop cultivators, mounted on agricultural tractors, have a transverse tool bar carrying a plurality of earth working tools to cultivate the soil between the rows of crops. Tool bars have various cross sectional shapes as square, diamond and T bar. When a single cultivator is used with a plurality of rows of crops, the earth working tools must be mounted on the cultivator tool bar with precision and in fixed positions to minimize the damage and destruction of the crops. Numerous types of clamps have been devised to connect the standard of an earth working tool to a tool bar. These clamps utilize retaining members to fix the clamp to the tool bar and nut and bolt assemblies to releasably mount the standard in the clamp. Examples of this type of clamp are shown in U.S. Pat. No. 2,873,149, U.S. Pat. No. 3,157,415 and U.S. Pat. No. 3,550,969. The retaining members are structured to accommodate a single type of tool bar. The standards in these clamps are only clamped in the longitudinal direction. They can move and tilt in use and thus alter the cultivating position of the earth working tool. In precision cultivating where small distances of the earth working tool relative to the rows of crops is important, the tilting or lateral shifting of the standard is undesirable, as the standard must be constantly checked and adjusted to insure proper alignment of the earth working tools with the rows of crops.

SUMMARY OF THE INVENTION

The invention broadly relates to a clamp or connecting structure for coupling a member to different shaped supports. The clamp has a body including a back, sides connected to and extended from the back, and leg portions joined to the sides opposite the back. The sides are spaced from each other to form a passageway for receiving a portion of the member. The member is retained in the body in a fixed position with a first holding means and a second holding means engaging separate portions of the member. The first holding means comprise nut and bolt assemblies engageable with the leg portions of the body and the member for holding the member in engagement with the back. The second holding means comprise nut and bolt assemblies associated with at least one side of the member for holding the member in a fixed position relative to the body.

The body is connected to the support with a retaining member and additional nut and bolt assemblies. The retaining member and body have shapes to accommodate a square tool bar, a diamond tool bar and a T shaped tool bar. All of the nut and bolt assemblies are removably mounted on the body so that they can be replaced.

The clamp is suitable for holding a shank of an earth working tool holder in a fixed perpendicular position. The shank is prevented from tilting or laterally moving by the second holding means which clamp the shank in a direction generally normal to the first holding means. This insures the selected location of the earth working tools, as discs, relative to the rows of crops to be cultivated.

An object of the invention is to provide a clamp that can be mounted on several shapes of tool bars. Another object of the invention is to provide a clamp that can hold a tool standard in a fixed vertical and a fixed lateral position. A further object of the invention is to provide a clamp which can be easily and cheaply manufactured without machining and which uses standard nut and bolt assemblies to attach the clamp to a tool bar and hold a tool holder shank in a fixed perpendicular position.

IN THE DRAWINGS

FIG. 1 is a side elevational view of the tool bar clamp of the invention in assembled relation with a transverse tool bar and an earth working tool holder;

FIG. 2 is a rear elevational view of the structure shown in FIG. 1;

FIG. 3 is a sectional view taken along the line 3—3 of FIG. 1;

FIG. 6 is a side elevational view, partly sectioned, of a modified clamp of the invention;

FIG. 7 is a sectional view taken along the line 7—7 of FIG. 6;

FIG. 8 is a side elevational view of the clamp of FIG. 6 mounted on a square tool bar; and FIG. 9 is a side elevational view of the clamp in FIG. 6 mounted on a pair of parallel T shaped tool bars.

Figure 4:
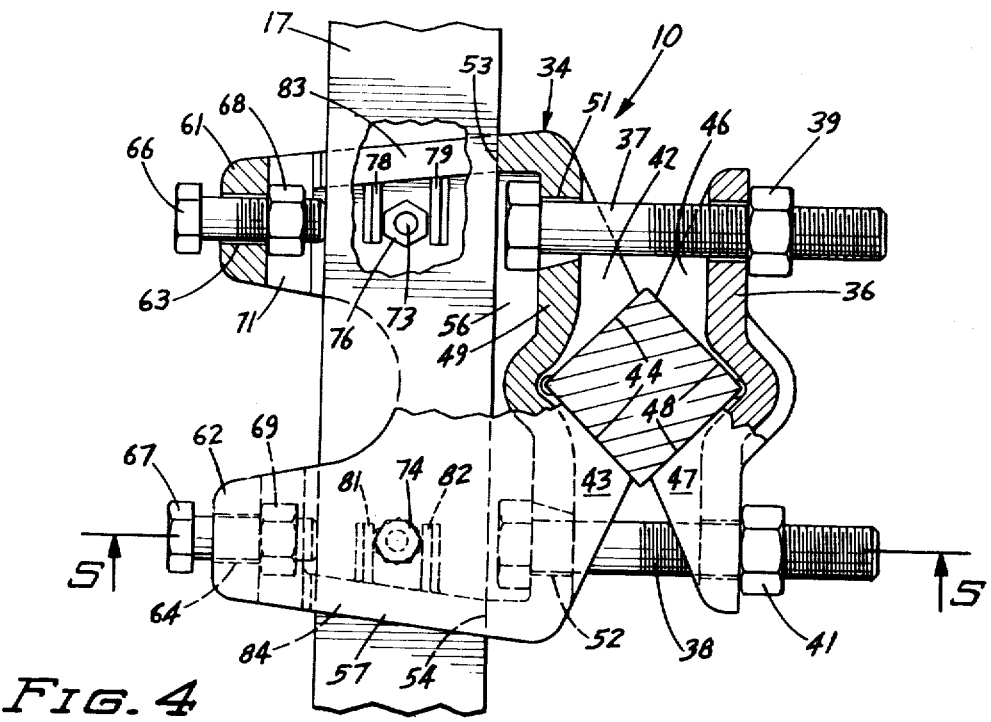
FIG. 4 is an enlarged side elevational view, partly sectioned, of the tool bar clamp of the invention.

Referring to the drawings, there is shown in FIGS. 1 to 3 the tool bar clamp of the invention, indicated generally at 10, mounted on a transverse tool bar 11 of a row crop cultivator. Tool bar 11 is substantially square in cross section and has a length sufficient to carry a plurality of earth working tools. Tool bars of this type are generally used in mounted relationship on three point hitches of farm tractors. An example of this type of multi-row crop implement is shown in U.S. Pat. No. 3,680,648 entitled Row Crop Cultivator. Other types of row crop cultivators, plowing implements, seeding and planting implements, fertilizer and herbicide units and the like, can be attached to a tool bar with the clamp of the invention. The following description is limited to a clamp for attaching a tool holder, indicated generally at 12, to the tool bar 11.

Tool holder 12 carries a pair of earth working discs 13 and 14 for turning and working the soil 15 on opposite sides of the row of crops 16, as beets, beans, corn and the like. Tool holder 12 has an upright standard or shank 17 and a horizontal trapezoidal-shaped plate 18 secured to the bottom of the standard. The standard 17 and plate 18 form a generally inverted T-shaped member. Secured to the outer sides of the plate are horizontal arms 19 and 21 which converge toward each other in a forward direction. The arms 19 and 21 are longer than the plate 18, with the forward portions of the arms extending beyond the front of the plate and the rear portions of the arms extending beyond the rear edge of the plate.

The lower edges 22 and 23 of the arms 19 and 21, respectively, are beveled or tapered downwardly and outwardly. Mounted on the arms 19 and 21 are adjustable clamps, indicated generally at 24 and 26, for carrying the discs 13 and 14. The clamps are identical in structure. Accordingly, the following description is limited to clamp 24. Clamp 24 has a top downwardly open hook portion 27 extended over the top of the arm 21 and a body 28 located along the outside of arm 21. Secured to the lower portion of body 28 is a leg 29. The leg 29 has an upwardly directed toe 31 having an upwardly and outwardly beveled edge forming a pocket for receiving the lowered beveled edge 22 of the arm 21. A bolt 32, threaded through the top of hook 27, engages the top of the arm 21 to fix and hold the position of the clamp 24 on the arm. Attached to the lower end of leg 29 is a bearing and axle unit 33 for rotatably mounting the discs 13 on the leg 29. The leg 29 can be provided with a twist about a vertical axis to fix the angular working pitch of the disc 13. Clamps with different types of pitches can be used to provide for a change in the working angle or pitch of the disc 13.

As shown in FIG. 3 of the drawings, the lateral space or mouth 35 between the leading edges of the discs 13 and 14 is relatively small. This requires an adjustment which must be maintained during the cultivation to prevent damage and destruction of the crops. To insure accurate location of the discs 13 and 14 relative to the row of crops, the tool holder 12 must be held in a fixed vertical and lateral position. This is accomplished with the tool bar clamp 10 of the invention.

Tool bar clamp 10 has a body or casting, indicated generally at 34, and a retaining member 36. A pair of bolts 37 and 38 couple the body to the retaining member 36 adjacent opposite sides of the transverse tool bar 11. Nuts 39 and 41, threaded on the bolts 37 and 38, respectively, clamp the back of the body 34 and the retaining member 36 on the tool bar 11. The body 34 has two pairs of ears 42 and 43 spaced from each other with a right angle recess 44 for receiving adjacent sides of the tool bar 11. The retaining member 36 has corresponding pairs of ears 46 and 47 spaced with a right angle recess 48. The ears 46 and 47 are in engagement with adjacent sides of the tool bar 11 and prevent rotation of the body 34 relative to the tool bar.

The ears 42 and 43 extend outwardly from a back 49 having a pair of holes 51 and 52 for accommodating the bolts 37 and 38. The holes 51 and 52 are slightly elongated and tapered in an inward direction permitting the bolts 37 and 38 to be removed from the body. Opposite edges of the back 49 have aligned transverse surfaces or faces 53 and 54 engageable with the forward edge of the standard 17. The body 49, between the faces 53 and 54, has a recess or cavity 56 for the heads of the bolts 37 and 38 so that the heads do not engage the standard.

Extended from the back 49 are spaced sides 57 and 58 forming with the back 49 a generally upright passageway 59 for the standard 17. Upper and lower portions of the sides 57 and 58 extend rearwardly into legs 61 and 62 which join the sides together. The legs 61 and 62 have holes 63 and 64, respectively, aligned with the holes 51 and 52 in the back 49.

A first pair of holding or clamping bolts 66 and 67 extend through the holes 63 and 64 and engage the outer edge of the standard 17. Nuts 68 and 69, located within the legs between the sides 57 and 58, are threaded onto the bolts 66 and 67 so that the bolts 66 and 67 function to hold or clamp the standard 17 in engagement with the faces 53 and 54. The nuts 68 and 69 are located between inwardly directed shoulders 71 and 72 with a loose fit so that the nuts can be removed from the legs. The shoulders prevent rotation of the nuts 68 and 69, whereby the bolts 66 and 67 can be adjusted relative to the legs.

Figure 5:
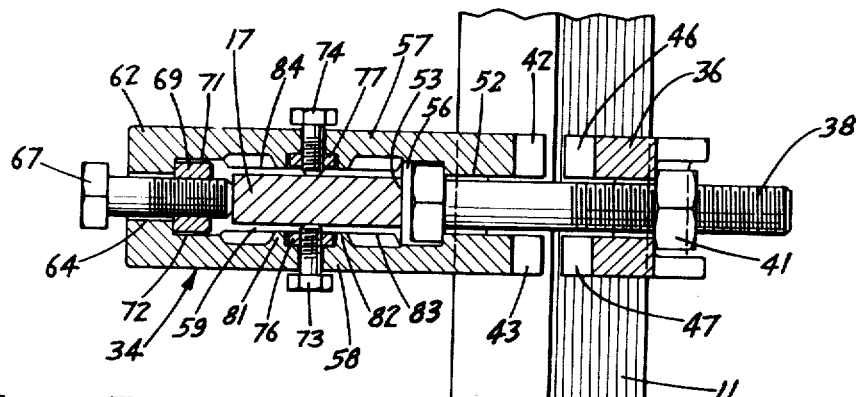
FIG. 5 is a sectional view taken along the line 5—5 of FIG. 4.

A second pair of lateral, side holding or clamping bolts 73 and 74, in the sides 57 and 58, are used to adjust the lateral or sideward position of the standard 17. The bolts 73 and 74, as shown in FIG. 5, extend through suitable holes in the sides 57 and 58 and are threaded into nuts 76 and 77. The nuts are located between parallel spaced ribs 78 and 79 and 81 and 82, respectively. The ribs are spaced from each other a distance substantially equal to the width of the nuts so that they hold the nuts from turning. Located adjacent the outer edges of the pairs of ribs 78, 79, 81 and 82 along the inside of the sides are flat shoulders 83 and 84 which have substantially flat faces facing the opposite sides of the standard 17. One pair of second holding bolts in one side of the body can be used to hold the standard in engagement with the opposite flat shoulders. This insures perpendicular alignment of the standard with the body of the clamp.

In use, the nut and bolt assemblies 37, 39 and 38, 41 clamp the body 34 and retaining member 36 about the tool bar 11 in a position in general vertical alignment with a row of crops 16. This positions the upright passageway 59 vertically above the row to accommodate the standard 17. The working depth of the earth working discs 13 and 14 can be adjusted by changing the position of the standard 17 relative to the body 34. The first pair of holding bolts 66 and 67 engage the forward edge of the standard 17 to longitudinally clamp the standard 17 in the body 34. The bolts 66 and 67 hold the standard 17 in engagement with the shoulders 53 and 54, as shown in FIG. 4. The nuts 68 and 69 are held captive between the shoulders 71 and 72 and the legs 61 and 62.

The standard 17 is also clamped in a sideward or lateral direction by the pairs of bolts 73 and 74. These bolts are used to correct the lateral tilting of the standard 17 and prevent any sideward movement of the standard 17 which would alter the cultivating positions of the discs 13 and 14 relative to the row of crops 16. Bolts 73 and 74 function to maintain the perpendicular position of the standard 17 relative to the tool bar 11 and row of crops. A single pair of lateral bolts, as bolts 74, can be used to hold the standard 17 in engagement with the side shoulders 83. The nuts 76 and 77, being captive between their adjacent ribs, anchor the bolts on the sides 57 and 58 so that the holes through the body 34 are smooth, thereby eliminating the additional machining of the body and special repairs.

The bolts 37 and 38 can be removed from the body 34 by first initially removing the nuts 39 and 41 and the retainer 36. The bolts then are tilted so that the heads of the bolts slide through the passageway into the space between the legs 61 and 62. In this manner, conventional nut and bolt assemblies can be used to clamp the body 34 and retaining member 36 to the tool bar 11. The bolts 66, 67, 73 and 74 can be removed from the body by turning them off of their respective nuts. The nuts are free to be separated from the body.

Referring to FIGS. 6 to 9, there is shown a modification of the clamp of the invention, indicated generally at 100. The clamp 100 is mountable on a support, as a tool bar, of an implement. The support can be a diamond tool bar 101, a square tool bar 102, or a pair of T tool bars 103. A standard or shank 104 of an earth working tool is held in the clamp in a fixed vertical and fixed lateral position.

Clamp 100 has a body indicated generally at 106 carrying the standard. A retaining member, indicated generally at 107, is connected to the body with a pair of bolts 108 and 109 which carry nuts 111 and 112 to releasably clamp or fix the body and retaining member to the bool bar 101. Bolt 108 has head 113 and a neck portion projected through an elongated slot 114 in the back 116 of the body. The body 109 has a similar head 117 and a portion projected through an elongated slot 118 in the back 116 of the body. The slots 114 and 118 extend toward each other and are separated by a center portion of the back 116.

A first pair of outwardly directed projections or legs 119 and 121 are on the back 116. Spaced from the first pair of projections is a second pair of projections or legs 122 and 123. The projections 119, 121, 122 and 123 with the central portion of the back form a generally U-shaped cavity 124. The base of the cavity is a generally transverse V-groove 126.

The retainer member 107 has an elongated base 127 having a first elongated slot 128 for receiving the bolt 108. The opposite side of base 127 has a second elongated slot 129 for accommodating bolt 109. The nuts 111 and 112 engage the outside face of the base 127. Projected inwardly from the inside of base 127 are a first pair of projections or legs 131 and 132. Spaced from the first pair of legs 131 and 132 are a second pair of projections or legs 133 and 134. The space between the pairs of legs is a generally U-shaped transverse cavity 136. The base of the cavity 136 has a transverse V-groove 137.

All of the legs on the body and retaining member are substantially identical in shape. The leg 119 is hereinafter described in detail. The leg 119 is integral with the back 116 of the body 106. The inside edge of the leg has a first face 138 extended along a plane that is approximately 45° with respect to the flat outer face of the base 116. Inwardly from the first face is a second face 139. The second face 139 is joined with a generally flat surface 141 on the outside of base 116. The face 139 projects outwardly at a slight divergent angle so that the square tool bar 102 can readily fit in the U-shaped cavity 124, as shown in FIG. 8. When the clamp is mounted on a diamond tool bar 101, as shown in FIG. 6, the corners of the tool bar fit in the V-shaped grooves 126 and 137. The opposite corners fit between the adjacent pairs of legs on the body and retaining member. The tool bar 101 engages both bodies 106 and 127 and all of the legs on both the body 106 and the retaining member 107 to stabilize and hold the clamp on the tool bar.

Referring to FIG. 8, the square tool bar 102 rests on the flat base surface 141 of the body 106 and the flat base surface 142 of the retaining member 107. The adjacent pairs of legs on the body and retaining member are on opposite sides, or upper and lower sides, of the tool bar 102.

As shown in FIG. 9, the retaining member 107 has pairs of ribs or flanges 143 that extend outwardly from the pairs of legs 131, 132 and 133, 134. These ribs 143 have outer edges that face the back of the clamp to provide bearing surfaces for the opposite portions of the T-shaped tool bars 103. The slots 114, 118, 128 and 129 in both the back 116 and the retaining member base 127 project toward the center of the base and retaining member a distance sufficient to allow the T-shaped tool bar to engage the outer sides of the pairs of legs 119, 121; 122, 123; 131, 132; and 133, 134.

As shown in FIGS. 6, 8 and 9, the retaining member 107, along with the structure on the back of the clamp, is usable to accommodate various shapes of supports or tool bars. As shown in FIG. 6, the diamond tool bar 101 is positioned between the body 106 and the retaining member 107. FIG. 8 shows a square tool bar 102 being located between the body 106 and retaining member 107. FIG. 9 shows a pair of T-shaped tool bars 103 being clamped between the body 106 and retaining member 107.

Referring to FIG. 7, the body 106 has opposite sides 144 and 146. The inside faces or walls of the sides 144 and 146 are engageable with opposite portions of the bolt heads 113 and 117 to prevent turning or rotation of the bolts. Each side has a large central opening 147. A longitudinal passageway 148 extends between the sides 144 and 146 through rectangular openings in the opposite ends of the body. The opposite end portions of the body have aligned seats or shoulders 149 and 151 engageable with separate spaced portions of the standard 104. A pair of longitudinal holding or clamping means, indicated generally at 152 and 153, function to force and hold the standard 104 into engagement with the shoulders 149 and 151. The first holding means 152 is mounted on a portion of the body or short leg means 154 integral with the side and end of the clamp body 106. The leg means 154 has an internal recess or cavity 158 and a hole 159. The opposite corner portion of the body 106 has a second portion or leg means 156 for retaining the holding means 153. The leg means 156 has an internal recess or cavity 161 and a hole 162. The first clamp means comprises a bolt 166 projected through hole 159. A nut located within the recess 158 is threaded onto the bolt. The second holding means 153 comprises a bolt 163 projected through hole 162. A nut 164 located in an inside recess or cavity 161 threaded onto bolt 163 holds the end of the bolt in engagement with the standard 104. The cavities 158 and 161 are of a size to accommodate the nuts and prevent turning or rotation of the nuts. The portions or leg means 154 and 156 are spaced from each other to permit removal of the bolts 108 and 109 from the body 106.

Each side 144 and 146 of the body has a pair of laterally spaced transverse or side holding means, indicated generally at 168 and 169. Each side holding means comprises a bolt 171 projected through a hole 172 in the side. The hole is open to an inside recess 173. A nut 174 located in recess 173 is threaded onto the bolt. The nut 174 engages the side wall and functions to hold the end of the bolt in engagement with the adjacent side of the standard 104. The nut 174 is prevented from turning by the side walls of the cavity. Only one pair of the second holding means on one side of the body can be used to fix the standard in engagement with the opposite inside portions of the body 106. This insures perpendicular alignment of the standard with the body of the clamp.

In use, the longitudinal holding means 152 and 153 act in concert with the transverse or side holding means 168 and 169 to longitudinally and laterally fix the position of the standard relative to the clamp. All of the holding means are conventional nut and bolt assemblies and can be removed from the body 106 and the retaining member 107.

While there has been shown and described a tool bar clamp in association with a dual disc tool holder, it is understood that other types of tool holders, tool implements or devices can be attached to a support by the clamp of the invention. The bodies 34 and 106 are preferably formed as one-piece metal castings. They can be welded fabricated members or made from other structural material, as reinforced plastic. It is understood that various other changes and substitutions and deletions may be made by those skilled in the art without departing from the spirit and scope of the invention.

The embodiments of the invention in which an exclusive property or privilege is claimed are defined as follows:

1. A clamp for connecting a member to a support comprising:
   body means including a back, sides connected to and extended from the back, portions connected to the sides opposite the back, and a passageway for receiving a portion of the member between the sides, back and portions;
   holding means engageable with the body means and the member for holding the member in engagement with the body means;
   retaining means for mounting the body means on the support, said retaining means and said body means having coacting means for selectively accommodating supports having square, diamond or T-shaped cross sections; said coacting means including linear portions on said back and ribs on the retaining means facing the linear portions whereby supports having T-shaped cross-sections can engage the back and retaining means; and
   fastening means coupling the retaining means to the body means with the support located between the retaining means and the body means.

2. The clamp of claim 1 wherein: said coacting means on the retaining means and body means include spaced pairs of leg means providing generally U-shaped facing recesses.

3. The clamp of claim 2 wherein: each leg means has a generally inside outwardly directed edge and an outwardly directed diagonal edge.

4. The clamp of claim 2 wherein: the body means and retaining means have aligned V-shaped grooves in the bases of the U-shaped recesses for accommodating corner portions of a support having a diamond shaped cross-section.

5. The clamp of claim 1 wherein: said fastening means comprise nut and bolt assemblies, said back of the body means having slots accommodating the bolts and side walls engageable with the heads of the bolts.

6. The clamp of claim 1 wherein: said holding means comprise a first holding means engageable with the portions and the member for holding the member in engagement with the back and second holding means engageable with at least one side of the body means and the side of the member for holding the member in a fixed position relative to the body means.

7. The clamp of claim 6 wherein: the first holding means comprise nut and bolt assemblies having bolts projected through holes in the portions and nuts on the inside of the portions.

8. The clamp of claim 6 wherein: the second holding means comprise nut and bolt assemblies having bolts projected through holes in said one side and nuts on the inside of said one side, said bolts engaging the adjacent side of the member.

9. A clamp for connecting a member to a support comprising:
   body means including a back, sides connected to and extended from the back, portions connected to the sides opposite the back and a passageway for receiving a portion of the member between the sides, back and portion;
   holding means engageable with the body means and the member for holding the member in engagement with the body means;
   retaining means for mounting the body means on the support, said retaining means and said body means having coacting means for selectively accommodating supports having square, diamond or T-shaped cross-sections, said retaining means including pairs of ears on the body means and pairs of ears on the retaining means respectively, with the ears of each pair separated from each other with generally U-shaped recesses for engaging opposite portions of the support, and
   fastening means coupling the retaining means to the body means with the support located between the retaining means and the body means.

10. The clamp of claim 9 wherein: said body means and retaining means each have V-grooves in the bases of said recesses.

11. The clamp of claim 9 wherein: said body means has a back with linear portions and said retaining means has ribs facing said linear portions of the back whereby supports having T-shaped cross-sections can engage the back and retaining means.

12. The clamp of claim 9 wherein: said holding means comprise a first holding means engageable with the portions and the member for holding the member in engagement with the back and second holding means engageable with at least one side of the body means and the side of the member for holding the member in a fixed position relative to the body means.

13. The clamp of claim 12 wherein: the first holding means comprise nut and bolt assemblies having bolts projected through holes in the portions and nuts on the inside of the portions.

14. The clamp of claim 12 wherein: the second holding means comprise nut and bolt assemblies having bolts projected through holes in said one side and nuts on the inside of said one side, said bolts engaging the adjacent side of the member.

15. The clamp of claim 9 wherein: each of the said projections includes an outwardly directed diagonal edge.

16. The clamp of claim 9 wherein: said fastening means comprise nut and bolt assemblies, said back of the body means having slots accommodating the bolts and sidewalls engageable with the head of the bolts.

17. A clamp connecting the member to a support comprising: body means including a back, sides connected to and extended from the back, portions connected to the sides opposite the back, and a passageway for receiving a portion of the member between the sides, back and portions; holding means engageable with the body means and the member for holding the member in engagement with the body means, said holding means comprising a first holding means engageable with the portions and the member for holding the member in engagement with the back and second holding means engageable with at least one side of the body means and the side of the member for holding the member in a fixed position relative to the body means, said second holding means comprising nut and bolt assemblies having bolts projected through holes in said one side and nuts on the inside of said one side of the body means, said bolts engaging the adjacent side of the member; retaining means for mounting the body means on the support, said retaining means and said body means having coacting means for selectively accommodating supports having square, diamond, or T-shaped cross-sections; and fastening means coupling the retaining means to the body means with a support located between the retaining means and the body means.

18. The clamp of claim 17 wherein: said coacting means on the retaining means and body means includes spaced pairs of leg means providing generally U-shaped recesses.

19. The clamp of claim 18 wherein: each leg means has a generally outwardly directed diagonal edge.

20. The clamp of claim 18 wherein: the body means and the retaining means have aligned V-shaped groves in the bases of the U-shaped recesses for accommodating corner portions of a support having a diamond-shaped cross-section.

21. The clamp of claim 17 wherein: said fastening means comprise nut and bolt assemblies, said back of the body means having slots accommodating the bolts and sidewalls engageable with the heads of the bolts.

22. The clamp of claim 17 wherein: said coacting means include linear portions on said back and ribs on the retaining means facing the linear portions whereby supports having T-shaped cross-sections can engage the back and retaining means.

23. The clamp of claim 17 wherein: the first holding means includes nut and bolt assemblies having bolts projected through holes in the portions of the body means and nuts on the inside of the portions of the body means.

* * * * *

PO-1050
(5/69)

UNITED STATES PATENT OFFICE
CERTIFICATE OF CORRECTION

Patent No. 3,825,358          Dated July 23, 1974

Inventor(s) Fred W. Eisenhardt and Hartley N. Ellingson

It is certified that error appears in the above-identified patent and that said Letters Patent are hereby corrected as shown below:

Column 5, line 11, "body" should be --bolt--.

Claim 18, line 3, after "U-shaped", insert --facing--.

Signed and sealed this 3rd day of December 1974.

(SEAL)
Attest:

McCOY M. GIBSON JR.        C. MARSHALL DANN
Attesting Officer           Commissioner of Patents